3,367,783
PROCESS OF PREPARING A FRUIT GEL
Fred W. Billerbeck, Fremont, Mich., assignor to Gerber Products Company, Fremont, Mich.
Filed Mar. 23, 1966, Ser. No. 536,871
10 Claims. (Cl. 99—131)

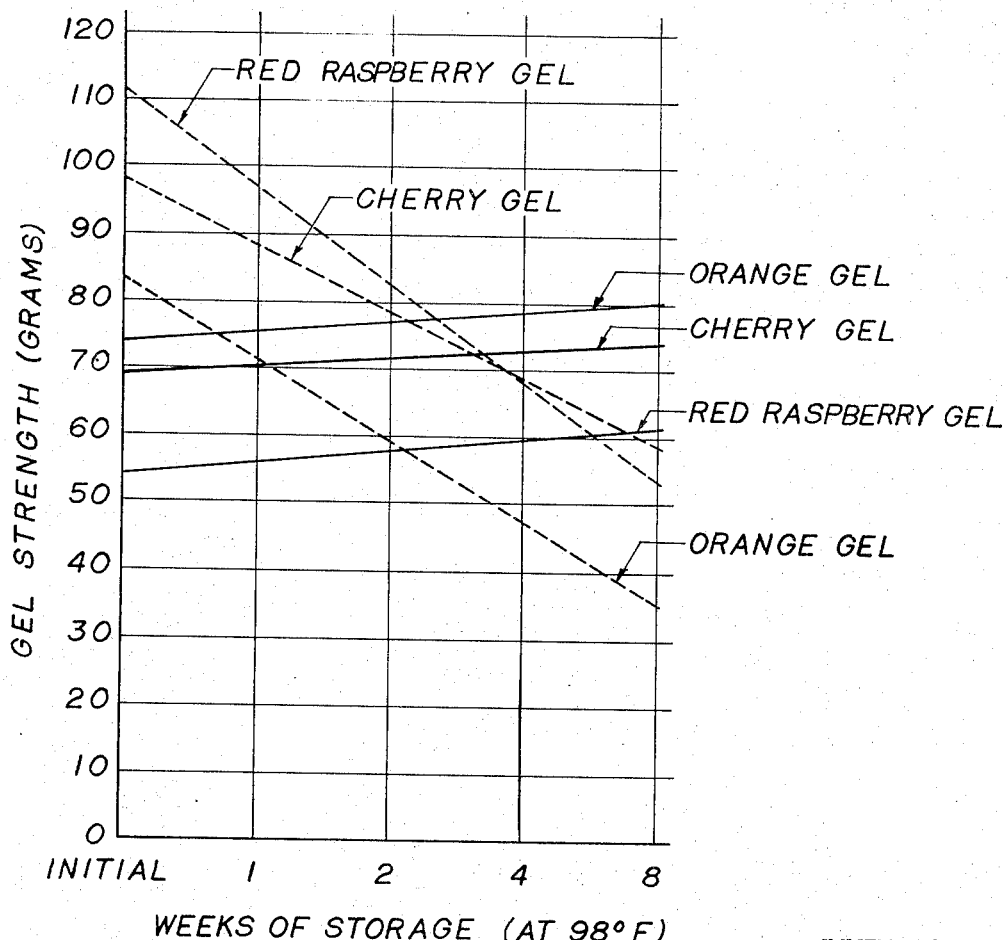

ABSTRACT OF THE DISCLOSURE

An acidic fruit gel prepared by mixing a combined gelling agent of locust bean gum and calcium carrageenan with an acidic aqueous formulation while retaining temperature at up to about 100° F., introducing the mixture into individual containers, sealing said containers, retorting said containers for a time sufficient to raise temperature of said mixture to 185–195° F., and thereafter quickly cooling.

---

This invention relates to fruit gel products having a firm, yet attractive appearance and the distinctive flavor of the natural fruit, and to a method for their preparation. The product is especially suited for use as an infant food.

The preparation of sweetened fruit gels has been accomplished by combining various fruit concentrates, juices, or essences with sugar, water and gelling agents such as calcium carrageenan, gelatin, sodium alginate, pectin and the like. However, the resulting gel products have heretofore lacked universal consumer acceptability because of certain undesirable properties. The use of the aforementioned gelling agents is known to produce chemical taste, low clarity and/or insufficient gel strength, especially if the fruit gel had been subjected to lengthy storage at moderately elevated temperatures.

It has now been found that a variety of fruit gel formulations can be prepared in a form that will retain attractive gel properties even after lengthy storage at elevated temperatures, i.e., temperatures above 70° F., by incorporating at least a combination of two specific gelling agents, calcium carrageenan and locust bean gum, in certain critical proportions relative to each other. Unexpected and highly desirable results are obtained by the employment of a combined gelling agent wherein 50–70% by weight of the combination of locust beam gum and calcium carrageenan is locust bean gum. In a sense this calcium carrageenan-locust bean gum combination is a replacement for the calcium carrageenan as used alone in prior gels. Consistent with prior gel technology, other forms and types of gelling agents may, and generally will be used with the calcium carrageenan-locust bean gum combination in preparing optimum products in accordance with this invention.

The sweetened, polysaccharide-containing fruit gels prepared as directed herein have unexpectedly superior gel characteristics when compared with those gels which have heretofore been commercially available. The fruit gels of this invention do not soften when stored at elevated temperatures. In contrast thereto, fruit gels prepared, for example, with calcium carrageenan alone lose significant gel strength upon prolonged storage and ultimately manifest a jelly-like consistency rather than the desired "jello" texture.

It has further been found that by employing both calcium carrageenan and locust bean gum, the combined weight of gelling agent necessary to retain the desired gel strength can be substantially reduced from that quantity of calcium carrageenan alone previously required. In addition, the undesirable end product "chemical taste," heretofore characteristic of a fruit gel containing calcium carrageenan, is not present when this combined gelling agent is employed.

Although some fruit gels prepared with only calcium carrageenan appear to have higher initial gel strengths, these strengths rapidly deteriorate upon storage at elevated temperatures. This aspect of the invention is graphically illustrated by the attached drawing which depicts the effect that lengthy storage at elevated temperatures has on fruit gel products prepared with a single gelling agent compared with the combined gelling agent disclosed herein.

Gelling agents such as calcium carrageenan are very susceptible to "hydrolysis," especially in the acidic environments of fruit concentrates, essences or juices which normally display a pH of about 3.5. Such hydrolysis substantially lessens the capability of the agent for gel formation. However, the acidic environment must be maintained to insure a final gel with an appetizing natural fruit taste.

Control of hydrolysis of the gelling agent is complicated by the necessity of heating the gel formulation to obtain the required levels of commercial sterility or pasteurization for products sold as infant foods, for example. In accordance with this invention, it has been discovered that hydrolysis of the gelling agent can be avoided or at least minimized so that the desired gel strength and longevity during storage is obtained if the gel formulation is rapidly cooled once it has been combined and pasteurized, preferably to about room temperature.

The process employed for the preparation of the fruit gels of this invention is generally consistent with that well known to those of skill in this art, except that certain of the processing operations connected with pasteurization have been modified to minimize the length of time during which the gelling agent remains in contact with a hot acidic environment. For example, in one embodiment the dry ingredients can be dispersed in an aqueous system at room temperature and the temperature rapidly raised through a series of heat exchangers to a suitable pasteurization temperature. The temperature is then maintained for only that length of time absolutely necessary to produce the required sterility. The pasteurized formulation is continuously filled into containers and cooled to about room temperature.

Another method for insuring that excessive heat will not be applied is to heat a solution containing the combined gelling agent and all other non-acidic ingredients to the required temperature. The heated mixture is then metered into containers simultaneously with a hot pasteurized solution of the fruit concentrate desired and food acids and quickly cooled.

In the most suitable processing method developed for rigid temperature control, it is preferred that all the ingredients be combined and thoroughly mixed at a relatively low temperature such as 100° F. The combined formulation is then pumped through a conventional line strainer into containers and sealed. The sealed containers are then retorted at about 210° F. for a short period of time, e.g., 8 to 10 minutes, so that the gel formulation will be briefly subjected to a suitable internal pasteurization temperature, e.g., up to about 185° F. to 195° F.

The duration of application of heat creating an internal temperature at or near this maximum intensity need only be sufficient for pasteurization. Therefore, the time during which the formulation is held at the maximum internal temperature should preferably be very brief, i.e., not in excess of a few minutes. The jars thereafter must be quickly cooled to about 65–70° F. to assure uniformity of gel strength throughout with the aid of, for example, a cold water quench.

Calcium carrageenan, an ester of a polymerized galactase having active sulfate sites, is derived from the red algae Chrondrus crispus by extraction and purification. The term calcium carrageenan as used throughout the specification and claims is meant to include such commercially available extracts as Gelcarin DG. Locust bean gum is conventionally obtained as an extract from the carob tree.

Other commercial forms of carrageenan gelling agents, referred to herein simply as "carrageenan," such as Gelcarin HWG have heretofore been included when calcium carrageenan was employed as the major gelling agent. Such gelling agents have also been found to further enhance the gel characteristics when incorporated in the gel formulations set forth herein, especially when employed in additional amounts of from about 300–600 grams per 100 gallons of gel formulation. Specifically, Gelcarin HWG has been found to assist in controlling the rigidity of set.

The amount of locust bean gum and calcium carrageenan necessary to produce the desired initial and prolonged gelling strengths has been found to be from about 3.5–6.0 lbs. per 100 gallons of fruit gel formulation. The preferred range is from about 4.0–5.0 lbs. for each 100 gallons of fruit gel formulation. In comparative tests employing calcium carrageenan alone, the minimum amount which was found to produce satisfactory initial gel strengths was about 6.0 lbs. per 100 gallons of gel formulation. In both cases, equal quantities of carrageenan (Gelcarin HWG) were also included to obtain the desired gel characteristics in the end products.

As previously set forth, that proportion of the combined gelling agent of locust bean gum and calcium carrageenan which comprises locust bean gum is between about 50 and 70% of the total weight of these two components. However, optimum results are produced when the locust bean gum is present as about 60% by weight of this combination of gelling agents, with the calcium carrageenan being the remaining 40% by weight. Whereas, employing a gelling agent containing this 50–70% ratio of locust bean gum to calcium carrageenan will produce the desired results in most cases, when employing certain fruits and under certain conditions it may be possible to vary this proportion somewhat. In any event, the amount of locust bean gum should be that which renders the end gel product free from syneresis during relatively high temperature storage, i.e., above 70° F.

When pH adjustment is necessary it can be most effectively accomplished through the use of a pH adjusting agent. The common food acids such citric, fumaric, malic, adipic, and the like are advantageous. Citric acid is preferred. In addition, ascorbic acid may be employed for the dual purpose of pH adjustment as well as the nutritional introduction of Vitamin C.

The amount of pH adjusting agent required will depend on the initial pH range of the specific fruit concentrate as well as upon the amount of sweetener and other ingredients included in the formulation and will vary in each individual application. A final pH of the gel formulation below about 4.3 and preferably between about 3.9 and 4.1 is sought. By controlling the pH of the gel formulation in this range, the natural flavor of the fruit is maintained.

Illustrative of the types of fruit from which suitable extracts (concentrates, juices or essences) can be obtained for the preparation of fruit gels in the manner set forth herein are cherry, orange, red raspberry, blackberry, plum, pineapple, apple, strawberry, grape and black raspberry. It will be obvious to one skilled in the art that many other fruits may be employed under similar process conditions.

The amount of fruit concentrate necessary to obtain a suitable consumer product of this type is well known and is governed by flavor and other practical considerations. However, for purposes of illustration, from 5 to 50% of the fruit concentrate, juice or essence by weight of the total ingredients, other than water, can be employed. When an apple gel is prepared, larger amounts of apple juice, and conversely lesser amounts of water, will usually be necessary.

Sugar, advantageously in the form of granulated white sugar for an infant food, is preferably included as the sweetener in suitable quantities as required. For example, about 80 to 200 lbs. of sugar for each 100 gallons of gel formulation provides end products of acceptable sweetness and flavor. In the alternative, when the fruit gel is being prepared for adult consumption, artificial sweeteners may replace the sugar.

In another aspect of the invention, certain ingredients can be included to enhance the nutritional value obtained especially where the fruit gel is intended for consumption by infants. In this respect, it is contemplated that ascorbic acid (Vitamin C) may be included either in its acid form or as sodium ascorbate. Other diet supplements, including thiamin ($B_1$), riboflavin ($B_2$), pyridoxine ($B_6$), niacin and the like may be included in the initial composition. Care must be taken in the addition of such ingredients because under certain circumstances color degradation may result.

Other ingredients, such as calcium sulfate per se, or its equivalent, can be added for the obvious beneficial aspects. Also salt may be included to enhance the flavor while the incorporation of tripotassium citrate will further improve the gel characteristics and buffer the formulation.

Head space foaming which may occur during retorting of the containers can be prevented by the addition of about 25 parts per million of conventional anti-foaming agents, such as glycol monooleate, propylene glycol esters and the like.

Referring more specifically to the drawing, it will be seen that fruit gels prepared with the desired combination of calcium carrageenan and locust bean gum not only do not deteriorate in gel strength during storage, as do gels prepared with calcium carrageenan alone, but actually increase in gel strength during prolonged periods of storage at elevated temperatures such as 98° F.

The results graphically illustrated in the figure were obtained from tests performed on various fruit gels containing either calcium carrageenan or the combined calcium carrageenan-locust bean gum as the gelling agent. Except for the change in gelling agent, process conditions and components employed were the same in each case.

The determination of gel strength was accomplished through the use of a Cherry-Burrell Curd Tension Meter equipped with an 0.845 inch OD plunger and 500 gram capacity dietary scale. Conventionally packed jars of gel, having been stored at about 98° F. for various lengths of time, were cooled to 70° F. The jars were opened and those with a smooth gel surface were individually placed on the pan of the measuring device so that the plunger contacted the gel approximately in the center of the exposed surface. When sufficient force was applied to rupture the gel, the indicating pointer snapped back. The point of maximum deflection was noted as the breaking force. The data obtained was plotted as indicated in the drawing.

To further illustrate the invention, the following example is provided.

A cherry gel formulation was prepared in the following proportions:

| Ingredient: | Lbs./100 gal. Formulation |
|---|---|
| Montmorency cherry juice concentrate | 27.0 |
| Dark sweet cherry concentrate | 27.0 |
| Granulated white sugar | 177.0 |
| Locust bean gum/calcium carrageenan (Gelcarin DG)[1] (1.5/1 weight ratio) | 4.0 |
| Tripotassium citrate | 2.0 |
| Carrageenan (Gelcarin HWG)[1] | 0.8 |
| Ascorbic acid | 0.7 |
| Salt | 0.5 |
| Calcium sulfate | 0.5 |

[1] Trademark of Marine Colloid, Inc.

The dry ingredients were blended and then slurried with 50–70 gallons of water. The cherry concentrates were placed in a mixing tank and the slurried dry ingredients added thereto. The volume was increased to 100 gallons by the addition of water. The temperature of the formulation was raised to 100° F. and the pH adjusted with citric acid to 3.9–4.1.

The formulation was pumped into small glass containers and sealed with caps. The containers were then placed in a retort having a water temperature of 100° F. The retort temperature was raised to 210° F. and maintained for 8 minutes. During this time period the internal container temperature rose from 100° F. to about 190° F. where it remained for about 2 minutes. The containers were then quickly cooled to an internal temperature of 65–70° F. with a conventional water quench and stored.

Although the foregoing invention has been described in some detail by way of illustration and example for purposes of clarity of understanding, it will be understood that certain changes and modifications may be practiced within the scope of the invention, as limited only by the scope of the appended claims.

I claim:

1. A retort process for preparing a sweetened, polysaccharide-containing acidic fruit gel, especially suitable for lengthy, high temperature, syneresis-free storage, from an acidic aqueous formulation, including as components, a fruit extract, a sweetener and a combined gelling agent, said gelling agent comprising locust bean gum and calcium carrageenan, the amount of said locust bean gum being about 50%–70% by weight of the total weight of gelling agent, said agent being present in an amount sufficient to cause said fruit extract and sweetener to form said gel, comprising the steps of: mixing said gelling agent with said acidic aqueous formulation while retaining the temperature at up to about 100° F., introducing said mixture into individual containers, sealing said containers, retorting said containers for a time sufficient to raise the temperature of said mixture to about 185°–195° F., and thereafter quickly cooling the heated mixture to avoid excessive breakdown in gel structure and maintain gel strength.

2. A process in accordance with claim 1 wherein said retorting is accomplished by heating said sealed containers at about 210° F. for up to about 10 minutes and said cooling is accomplished by quenching said heated mixture with water to about 65°–70° F.

3. A process in accordance with claim 1 wherein the combination of locust bean gum and calcium carrageenan is employed in an amount from about 3.5–6.0 pounds per 100 gallons of initial aqueous mixture.

4. A process in accordance with claim 3 wherein the aqueous formulation additionally has included therewith sufficient carrageenan to assist in controlling the rigidity of set.

5. A process in accordance with claim 4 wherein the carrageenan is added in an amount from 300 to 600 grams per 100 gallons of gel formulation.

6. A process in accordance with claim 3 wherein the pH of the aqueous formulation is adjusted to about 3.9–4.1 prior to pasteurizing.

7. A process in accordance with claim 6 wherein the pH adjustment is accomplished with a food acid.

8. A process in accordance with claim 7 wherein the pH adjusting agent is citric acid.

9. A process in accordance with claim 1 wherein the total weight of locust bean gum and calcium carrageenan comprises about 60% by weight of locust bean gum.

10. A process in accordance with claim 1 wherein said sweetener is granulated white sugar and said fruit gel is especially suitable for infant feeding.

References Cited

UNITED STATES PATENTS

| 2,466,146 | 4/1949 | Baker | 99—131 |
| 2,563,996 | 8/1951 | Edgar | 99—131 X |
| 3,031,308 | 4/1962 | Campbell | 99—131 |

OTHER REFERENCES

Whistler et al.: "Industrial Gums," 1959, Academic Press, New York, pages 94 to 97, 108 to 111, 374.

A. LOUIS MONACELL, *Primary Examiner.*

JOSEPH M. GOLIAN, *Examiner.*

J. M. HUNTER, *Assistant Examiner.*